United States Patent [19]
Brainard

[11] Patent Number: 5,486,749
[45] Date of Patent: Jan. 23, 1996

[54] MULTIPLE BATTERY CHARGER WITH A POWER SOURCE CONTROL

[75] Inventor: Gerald L. Brainard, San Jose, Calif.

[73] Assignee: AST Research, Inc., Irvine, Calif.

[21] Appl. No.: 80,272

[22] Filed: Jun. 21, 1993

[51] Int. Cl.$^6$ ............................. H02K 7/18; H02P 3/00
[52] U.S. Cl. ............................. 320/9; 320/10; 320/5
[58] Field of Search ............................. 320/15, 22–24, 320/39

[56] References Cited

U.S. PATENT DOCUMENTS

| | | | |
|---|---|---|---|
| 4,118,661 | 10/1978 | Siekierski et al. | 320/40 |
| 4,467,264 | 8/1984 | Blake et al. | 320/2 |
| 4,614,905 | 9/1986 | Petersson et al. | 320/18 |
| 4,670,703 | 6/1987 | Williams | 320/22 |
| 4,680,528 | 7/1987 | Mikami et al. | 320/32 |
| 4,792,743 | 12/1988 | Tsujino et al. | 320/15 |
| 4,849,682 | 7/1989 | Bauer et al. | 320/15 |
| 4,885,521 | 12/1989 | Crampton | 320/14 |
| 5,003,244 | 3/1991 | Davis, Jr. | 320/17 |
| 5,028,859 | 7/1991 | Johnson et al. | 320/15 |
| 5,153,496 | 10/1992 | La Forge | 320/17 |
| 5,177,425 | 1/1993 | Goto | 320/6 |
| 5,198,743 | 3/1993 | McClure et al. | 320/31 |
| 5,283,512 | 2/1994 | Stadnick et al. | 320/18 |
| 5,371,454 | 12/1994 | Marek | 320/15 |
| 5,422,558 | 7/1995 | Stewart | 320/7 |

Primary Examiner—Steven L. Stephan
Assistant Examiner—Nicholas Ponomarenko
Attorney, Agent, or Firm—Knobbe, Martens, Olson & Bear

[57] ABSTRACT

A battery charging system is disclosed that includes an efficient switch mode power supply, multiple linear current limiters, and feedback means to allow the switch mode power supply to operate at the minimum voltage necessary to operate a power load and charge batteries. Furthermore, the switch mode power supply is capable of producing the maximum power required by the system, such as when the battery charger is used in conjunction with operation of a electronic device with peak load demands such as when a hard disk is accessed in a portable computer. Two control mechanisms are found in the battery charging system. The first mechanism is an input used to control the switch mode power supply output voltage from an external source. In one embodiment, this is done by referencing a first voltage to that internal to the switch mode power supply. The second mechanism is to limit the current within the switch mode power supply not controlled by an external source. This current limiting feature is linear and is set at an absolute limit point. Each limiter supplies charge current to a battery, which charge current is monitored and compared to a reference voltage with the resulting error voltage used to control the output of a series pass controller, such as a transistor.

8 Claims, 4 Drawing Sheets

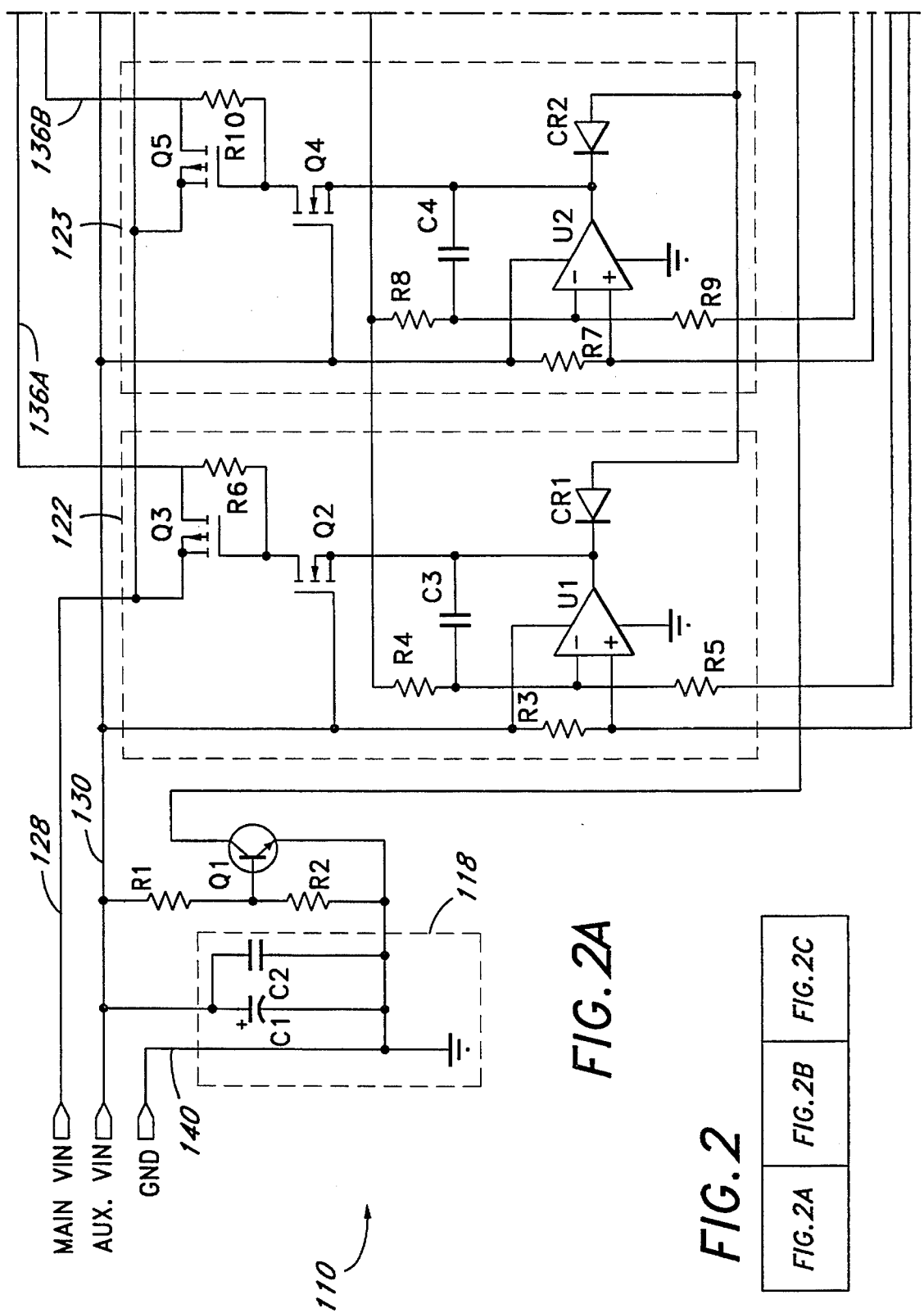

MULTIPLE BATTERY CHARGER WITH A POWER SOURCE CONTROL

BACKGROUND OF THE INVENTION

The present invention is directed towards an efficient battery charger, and more specifically, to an efficient multiple battery charger having an improved power controller that senses the power demand on each battery and provides the minimum output voltage required to charge all, including the battery with greatest demand.

In battery powered portable electronic systems the portable power supply is usually provided by either disposable batteries, replaceable batteries, such as Nickel Cadmium (NiCd), or other rechargeable batteries. The disposable batteries are well known, but are not rechargeable. Since many users desire to use their electronic device without regard to whether an electrical outlet is available to power the device, such consumers typically rely on rechargeable batteries to power the device. One such type of battery is the rechargeable battery, which typically requires a dedicated battery charger. Another type of battery is a battery pack specifically designed for the portable electronic device. In this type of device, the manufacturer of the device allows the battery pack to be replaceable so that a second battery source can be carried to replace the first pack in the event that the first battery pack has its charge depleted. The next type of batteries are those intended to be permanently installed in the device. Once the batteries are drained of their energy, either they must be recharged or the device must be powered by an alternative power source before the device can resume operation.

In devices that use either separate battery power packs or internal batteries, several batteries are charged during the same recharging session. Most frequently, each battery is at a different voltage level from the others in the pack. This leads to an inefficient charging scheme when all batteries are being recharged simultaneously. Alternatively, some systems attempt to recharge each battery separately from the others, but do so in a manner that is highly inefficient in that the charging load does not adjust as the voltage charge on each battery reaches a full charge state. This power loss is usually in the form of heat, which can be damaging to the electronic device if any of the fail safe mechanisms in the device fail under certain circumstances.

Accordingly, what is needed is a battery charger with a power controller that operates at the minimum voltage possible in order to reduce power loss and heat. Furthermore, the power charger should be able to respond to peak loads when used in combination with the powering of the electronic device while charging the batteries to operate the device without interfering with system performance.

SUMMARY OF THE INVENTION

According to the invention, a battery charging system is disclosed using a power supply, such as a switch mode power supply, and multiple linear current limiters. The limiters use feedback means associated with the battery charger to allow the switch mode power supply to operate at the minimum voltage necessary to operate a power load and charge batteries. This system also allows the switch mode power supply to produce maximum power required by the system. Such occurs when the battery charger is used during the same operation of an electronic device with peak load demands, such as when a hard disk is accessed in a portable computer.

The battery system further includes two control mechanisms for increasing operating efficiency. The first mechanism is an input for controlling the switch mode power supply output voltage from an external source. In one embodiment, this is done by referencing a first voltage to the voltage internal to the switch mode power supply. The second mechanism limits the current within the switch mode power supply not controlled by an external source. This current limiting feature is linear and is set at an absolute limit point. Each limiter supplies charge current to a battery. Each charge current is monitored and compared to a reference voltage with the resulting error voltage used to control the output of a series pass controller, such as a transistor.

BRIEF DESCRIPTION OF THE DRAWINGS

FIGS. 2A, 2B and 2C are schematic diagrams illustrating the specific embodiment of the battery charger in FIG. 1.

DETAIL DESCRIPTION OF SPECIFIC EMBODIMENTS

Figure 1:
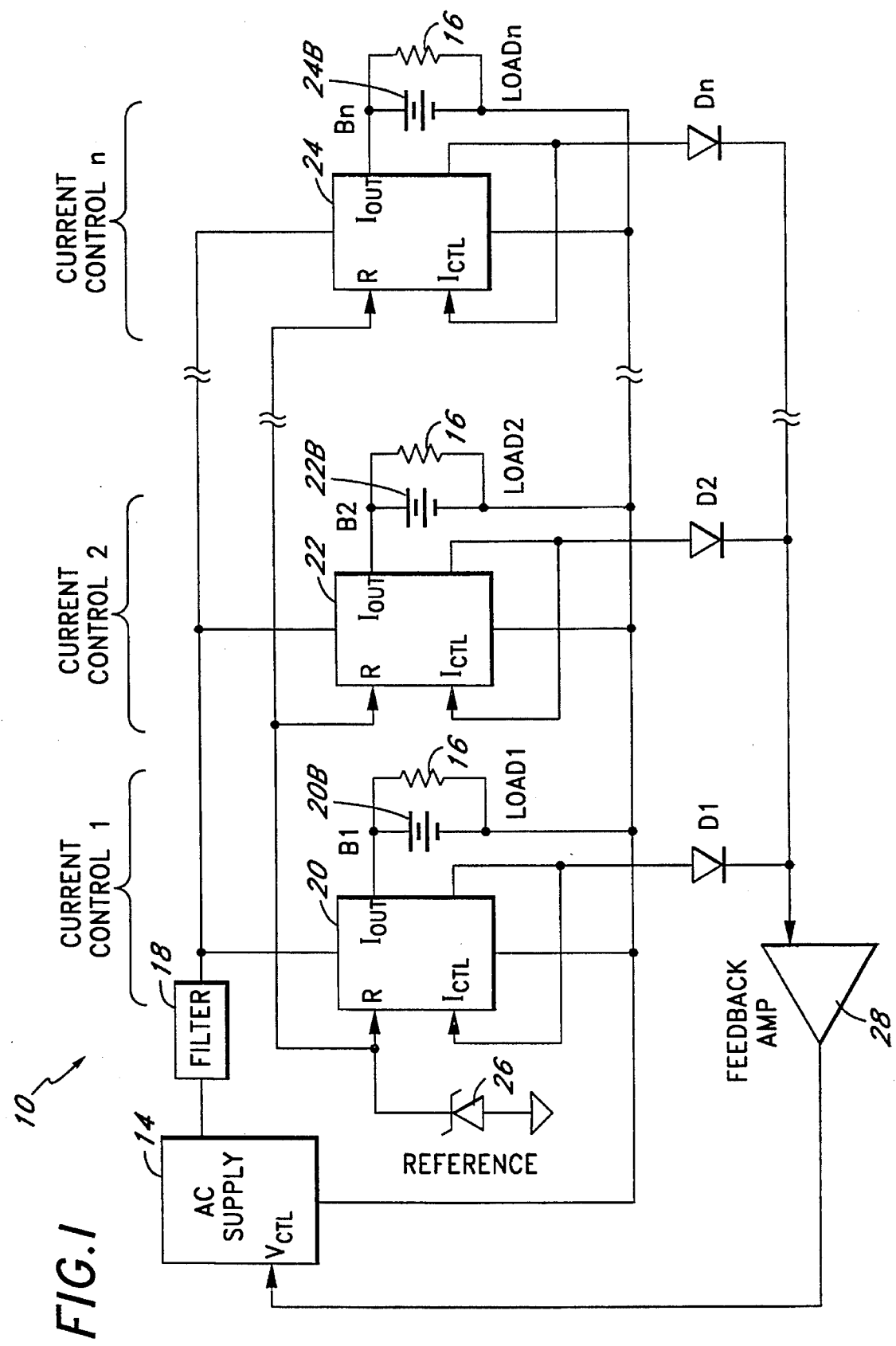
FIG. 1 is a block diagram of a battery charger according to the present invention, which is able to charge multiple batteries at the minimum voltage possible.

A battery charger 10 with an efficient power controller 12 is disclosed in FIG. 1 and described below. Battery charger 10 includes a power source 14, typically an alternating current voltage source such as, for example, the 110 AC voltage from any electrical outlet common to most buildings. The power source 14 modifies and rectifies the voltage and then steps it down to a level useable by the battery charger 10 and, subsequently, the load 16 to be powered. These techniques are well known in the art and are left to the skilled artisan for implementation. The power source may also be the type used and described in, for example, commonly assigned U.S. patent application Ser. No. 08/080,384, titled Universal Power Converter, filed herewith and herein incorporated by reference for all purposes. The power source 14 is further connected to a noise filter 18, which is used to filter the power supplied to the battery charger 10 and load 16.

The power source is further connected to various current control circuits 20, 22 and 24, which are used to regulate the current, thus limiting the voltage applied to their respective batteries, 20B, 22B and 24B. Each of the current control circuits 20, 22 and 24 are further connected to their respective battery 20B, 22B, and 24B. According to the present invention, the number of control circuits is determined by the number of battery packs, which can be any number N. One current control circuit is provided for each battery pack. Each battery 20B, 22B and 24B is further connected to the load 16, such as, for example, a personal portable computer, a cellular phone, a portable stereo, or any other like electronic device.

Furthermore, the batteries may use non-dissipative charges equalization controls as, for example, described in commonly assigned U.S. patent application Ser. No. 08/080, 898, titled Non-Dissipative Battery Charger Equalizer, filed herewith and incorporated by reference for all purposes.

Finally, the power source 14 is further connected to a voltage reference 26, which is used to control the current in each current control circuit 20, 22 and 24 and subsequently to control the voltage applied to each battery as charged.

The power supply 14 intended for use in the battery charger 10 is based on a switch mode power supply and is used in conjunction with multiple linear current limiters, which are implemented in the current control circuits 20, 22 and 24. Feedback amplifier 28 is used in conjunction with the current limiters to operate the switch mode power supply in such a manner as to minimize the voltage output for charging the batteries or operating the system. The switch mode power supply is capable of producing a maximum power required by the system. This system uses two control mechanisms. The first is an input used to control the switch mode power supply output voltage from an external source. This is typically in the form of a voltage that is compared with a reference internal to the switch mode power supply. The second mechanism is current limiting within the switch mode supply not controlled by an external source. The current limiting is linear and is set at an absolute limit point. Other types of current limiting are not intended to be used, which types include hold back or burp mode limiting. Importantly, the switch mode power supply must operate reliably in either the voltage or current modes. This is accomplished by causing the switch mode power supply to limit current in a linear fashion.

Each current limiter module then supplies the charge current to its respective battery. The charge current is monitored and compared to a reference and the resulting error voltage is used to control the output of a series pass element, which obtains its voltage from the switch mode power supply. Each battery and current sense device may have in parallel a computing device or other electrically powered component and, therefore, the series pass element must be capable of supplying the total of component and battery charging current.

Several current limiting circuits, or current control circuits may be driven in parallel from a single switch mode power supply. Since any of the batteries can be charging at a voltage different than the others at any given point in time, the switch mode power supply needs to develop sufficient voltage to allow charging the battery with the highest voltage. To reduce power loss and heat in the series pass elements, and to keep such losses at a minimum, the switch mode power supply output is not allowed to be greater than the highest voltage required. Each current source control circuit then has a secondary output that is combined with the other signals in such a way that the one with the greatest signal causing that pass element to be saturated is fed back to the switch mode power supply, thereby causing the power supply to reduce its output to maintain the correct charge current for that battery. By this means, there is always one of several series pass elements that is fully saturated, insuring that the output of the switch mode power supply will be no greater than the minimum required.

Based on this arrangement, during moments of peak loading, such as spinning up a hard disk, a CD-ROM drive, or any other like peak load operation, the switch mode power supply is not required to continue full rapid charging on all batteries and reduces its output below that which will sustain rapid charge in all batteries, which action is accomplished by the internal current limiter. This diverts the current necessary to supply the power to the demand load momentarily.

Figure 2B:
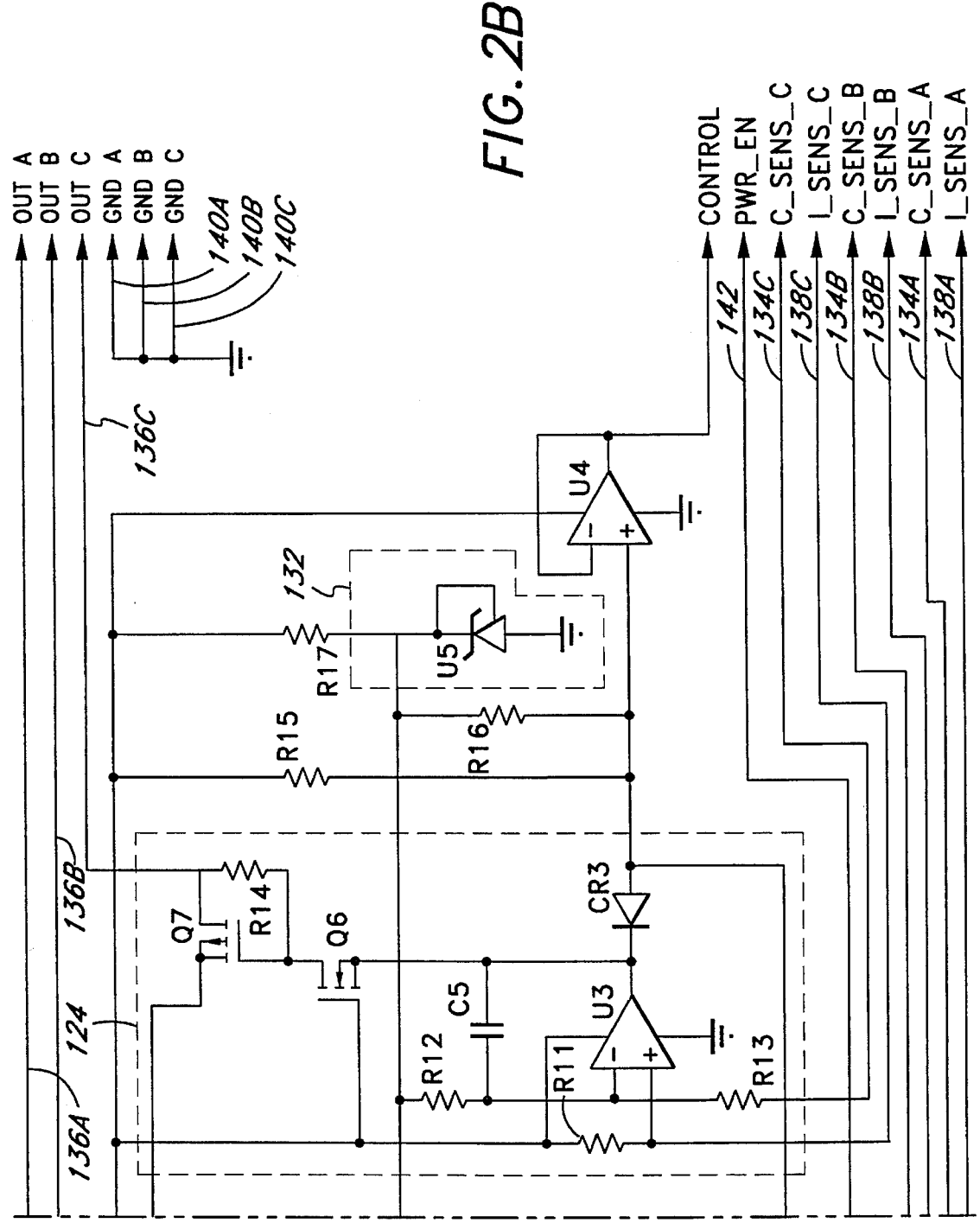
Figure 2C:
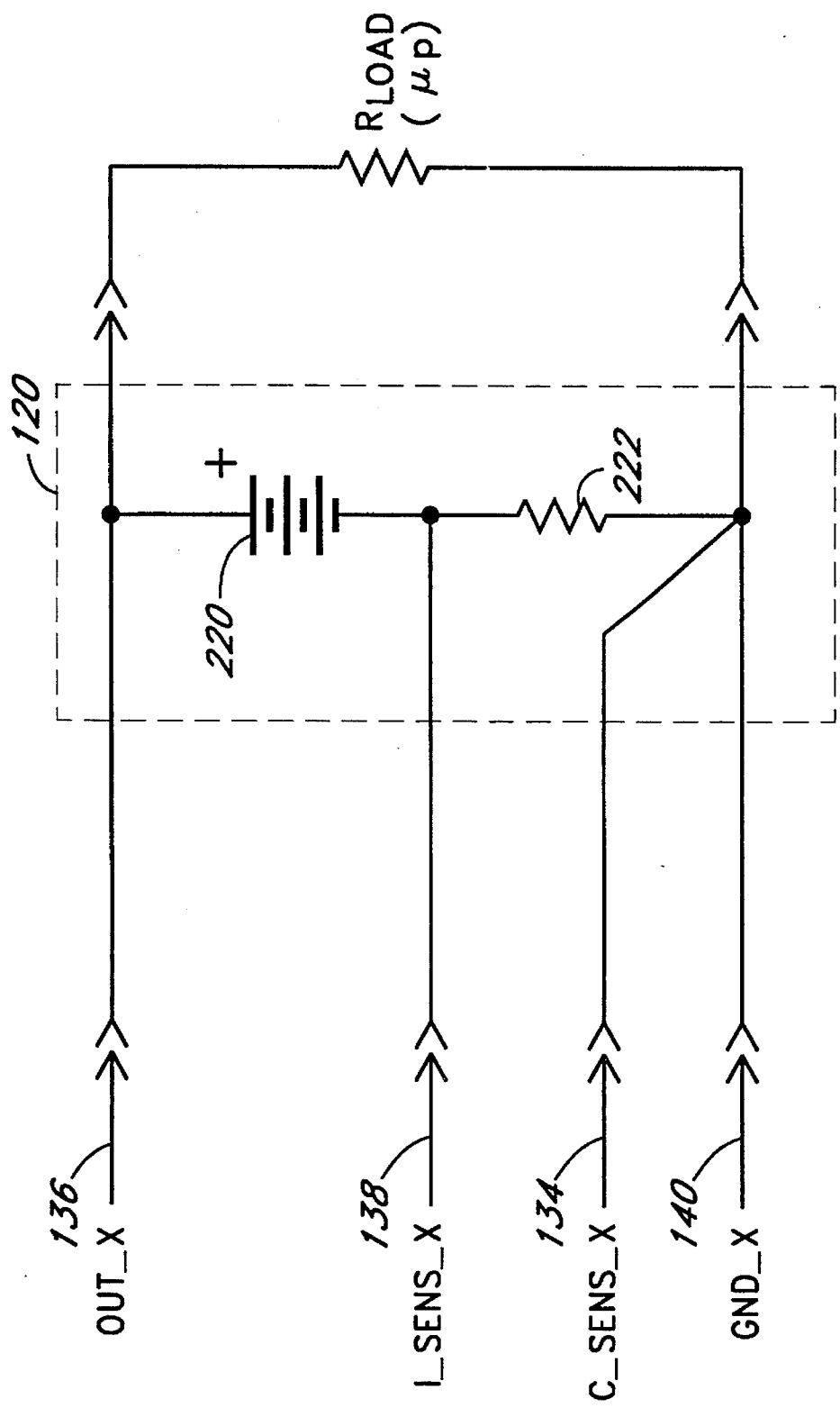

A preferred embodiment of the present invention is illustrated in FIG. 2, which includes FIGS. 2A, 2B and 2C. In FIGS. 2A and 2B the battery charger 110 is connected to a power source, or power supply (not shown), which offers two levels of power for use in the battery charger 110. The first level of power comes in on power main line 128. The second comes in on power auxiliary line 130. The main power line 128 supplies around three (3) Amperes (A) of current, which the auxiliary power line 130 supplies 168 mA. The main power line 128 services the current control circuits 122, 123, 124 for recharging the batteries (not shown). The auxiliary power line 130 provides operating current for the current control circuitry and substantially follows the main input voltage level.

A voltage reference element 132, which is powered by the auxiliary power line, provides a stable 2.5 volt reference voltage at the cathode of the Schottky Diode U5. This voltage is divided by resistor pairs R4–R5, R8–R9, and R12–R13, for current control circuits 122,123, and 124, respectively. The reduced referenced voltage from each voltage divider pair R4–R5, R8–R9, and R12–R13 is then presented to the inverting inputs of amplifiers U1, U2, and U3, respectively. Divider resistors R5, R9, and R13 are grounded remotely to the respective battery pack negative terminals, to reduce the effects of current on the power ground circuit. Each current control circuit 122, 123, and 124 is connected to a respective battery pack (See FIG. 2C) wherein a current output line (OUT) 136A, 136B, and 136C, a current sense (I.SENS) line 138A, 138B, and 138C, a control sense (C.SENS) line 134A, 134B, and 134C, and a ground (GND) line 140A, 140B, and 140C are coupled to the battery pack.

In FIG. 2C, the battery 220 in the battery pack 120 is connected between the OUT line 136 and the current sense lines, while a regulating resistor 222 is connected in series with the battery 220 and between the I. SENS. line 138 and the C. SENS. line 134. Thus, the battery 220 and resistor 222 are connected between the OUTput line 136 and the I. SENS. and GND. lines 138 and 140, respectively. A resistive load RLOAD, such as a microprocessor of a portable computing device, may be connected in parallel to the battery pack 120.

As illustrated in FIGS. 2A and 2B the C. SENS. lines 134A, 134B, and 134C are connected to noninverting inputs of each of the current sense amplifiers U1, U2, and U3, respectively. Current through a given battery is then represented as a voltage at the noninverting input of the corresponding current sense amplifier U1, U2, or U3. The sensed voltage is then compared with the divided reference voltage to cause the amplifier output to respond in a manner that will control the current through the battery.

Current to the batteries is supplied through pass transistors Q3, Q5, and Q7, which are P-channel MOS field effect transistors (FET), and are connected to the main power line 128 on the source side of the transistor and to the battery on the drain side of the transistor, with the gate being coupled to the output of the current sense amplifiers U1, U2, and U3, respectively. Charging current is controlled by varying the gate voltage to the pass transistor Q3, Q5, and Q7 from the outputs of the current sense amplifiers U1, U2, and U3, respectively, through current shut off transistors Q2, Q4, and Q6, respectively. Each current shut off transistor Q2, Q4, and Q6, respectively, is turned off during the absence of input power to prevent the batteries from discharging through resistors R6, R10, and R14, respectively, which resistors are current pull up resistors between the respective gate and source of each pass transistor Q3, Q5, and Q7.

Since the pass transistors Q3, Q5, and Q7 are P-channel MOSFETs, they increase conduction as the gate voltage is made to go increasingly negative with respect to the FET source. As the proper charging current is reached, the output of each current sense amplifier U1, U2, and U3 then increases to provide a gate voltage that maintains the desired current.

A buffer amplifier U4 provides an output voltage to control the main input voltage for each current control circuit 122, 123, and 124. The connection to amplifier U4 is the power to amplifiers U1–U4. As the output voltage decreases, the main supply output voltage is caused to increase. The output of buffer amplifier U4 is controlled by the lowest signal of all the output signals from current sense amplifiers U1, U2, and U3 through their respective diodes CR1, CR2, and CR3. The input to buffer amplifier U4 is biased by resistor R15.

During charging operation, the battery having the highest initial charge will demand the greatest charging voltage. This demand causes the output of its respective error amplifier to decrease in an effort to increase the output of the corresponding pass transistor Q3, Q5, or Q7. This causes a response at the output of buffer amplifier U4 to force the main power supply line 128 to provide the required voltage to the input of the pass transistor Q3, Q5, or Q7 associated with the battery having the greatest charging voltage demand. In this manner, the pass transistor associated with the battery having the greatest charging voltage demand becomes fully saturated. Via this means, the charging voltage supplied to the controller is held at the minimum voltage required to charge all batteries, thereby reducing the power loss in the main supply and the charge control pass transistors to a minimum. Each current control circuit 122, 123, and 124 further includes a stabilizing or integrating capacitor C3, C4, and C5, respectively. Furthermore, resistor R15 serves as a bias resistor for each control diode CR1, CR2, and CR3. In addition, resistor R16 provides a 2.5 volt reference to ground at voltage reference U5. Resistor R17 is connected between the auxiliary power line and the voltage reference U5 to provided operating current for the 2.5 volts reference.

Because of the large power handling capabilities of pass transistors Q3, Q5, and Q7, each is mounted on a heat sink to help dissipate the heat generated inside the transistor. It should be noted that the circuitry used in this battery charger control circuit may be implemented in a single integrated chip. Such a chip may be mounted on a single heat sink. On the other hand, the pass transistors may be integrated together on the same chip but separate from the other elements in each current control circuit. This allows the pass transistors to be mounted to the same heat sink.

The power dissipated by the series pass elements (charger) depends on charging/load current multiplied by the voltage across the element. Since current is constant (except for trickle charge), power loss is proportional to series pass voltage. Since minimum series pass voltage is maintained, the worst case power loss quickly becomes quite small as battery voltages equalize. As batteries go into trickle charge, power loss becomes negligible. As batteries become similar in voltage and as each battery reaches a full charge, power dissipation is held at a minimum and is eventually reduced to only that necessary to charge the remaining batteries. Once the batteries are fully charged, a trickle charge of only 45 milliwatts is required to maintain the batteries at a full charge state while the power or battery charger is in operation. In typical battery charging systems, the power dissipation does not reduce gradually in a manner that tracks the power requirements to charge the batteries efficiently, rather, the power dissipation is either at full level, for example, 11 watts, or at a trickle charge state of, for example, 45 milliwatts, with no power variation in between. Accordingly, it is apparent that there is a large amount of power loss associated with the prior battery charging systems that are either on full power or at a trickle charge without any power tracking capabilities as the batteries go from reduced power consumption a full depletion state and full charge state.

Since the auxiliary power line is used to provide operating current to the current control circuits, a noise filter 118 is provided to filter the voltage before reaching the current control circuits 122, 123, 124. The noise filter 118 includes a pair of capacitors C1 and C2, which are optimized to provide the best noise filtering capabilities. These two capacitors are connected together in parallel between the auxiliary power line 130 and ground 140. A transistor Q1 is connected between the auxiliary power line 130 and the power enable line 142 of the power supply, which line 142 is used to turn on monitoring circuits in the battery packs when power is available.

A novel battery charging system for charging multiple batteries has been described. It will be understood by those skilled in the art that variations and modifications can be effected within the spirit and scope of the invention as described above and as defined in the following claims.

What is claimed is:

1. A battery charging apparatus which continuously. charges multiple batteries during a charging cycle, comprising:

a power supply which provides charging current to all batteries simultaneously;

a plurality of linear current limiters coupled to said power supply and each linear current limiter further connected to a respective battery to continuously provide charging current to said respective battery during said charging cycle, wherein each current limiter includes means to control the amount of charging current supplied to said respective battery; and means, coupled to said power supply and to each battery, and to each of said plurality of linear current limiters, for providing feedback information indicative of a voltage level of said respective battery to each of said plurality of current limiters, wherein each of said plurality of linear current limiters reduces the voltage drop across itself in response to said feedback information to maintain substantially constant current through said respective battery during said charging cycle.

2. The apparatus of claim 1 wherein said power supply is a switch mode power supply.

3. The apparatus of claim 1 wherein each of said plurality of linear current limiters comprises a series pass transistor coupled between said power supply and said battery for controlling the voltage applied to said battery.

4. A battery charging apparatus which continuously charges at least first and second batteries during a charging cycle, said apparatus comprising:

a power supply which provides charging current to said first and second batteries simultaneously; and at least first and second current limiters, wherein each current limiter is connected between said power supply and a respective one of said at least first and second batteries to continuously supply charging current to said battery connected thereto during said charging cycle, and wherein each current limiter senses a voltage proportional to an actual current level through said battery connected thereto, each current limiter comparing said sensed voltage with a reference voltage to obtain a feedback signal used to adjust the voltage drop across itself so as to maintain substantially constant charging current through said battery connected thereto.

5. The battery charging apparatus of claim 4, wherein each current limiter includes a pass transistor having a source connected to said power supply, a drain connected to said respective battery, and a gate connected to said feedback signal such that the amount of voltage drop across each current limiter is varied based upon the level of said feedback signal applied to said gate.

6. The battery charging apparatus of claim 4, wherein the feedback signal from each current limiter is connected to a feedback amplifier such that the feedback amplifier generates a voltage control output signal based upon a greatest actual current level from a battery having a greatest voltage level, wherein said power supply receives said voltage control output signal and adjusts the voltage output therefrom in accordance with said voltage control output signal to a level required to charge the battery with the greatest voltage.

7. A battery charger which continuously charges a plurality of batteries during a charging cycle comprising:

a power supply which provides a voltage output to all batteries simultaneously;

a plurality of current control circuits, wherein each current control circuit is connected between said power supply and a respective one of said batteries to continuously supply charging current to said respective battery during said charging cycle, each of said current control circuits sensing a voltage proportional to an actual current level through said respective battery and comparing said sensed voltage with a reference voltage to obtain a feedback signal indicative of the voltage level of said respective battery; and a feedback circuit which receives said feedback signals from said current control circuits and generates a voltage control output signal based upon a lowest level feedback signal, wherein said power supply receives said voltage control output signal and adjusts the voltage output therefrom to a level required to charge the battery with the greatest voltage level.

8. The battery charging apparatus of claim 7, wherein each current control circuit includes a pass transistor having a source connected to said power supply, a drain connected to said respective battery, and a gate connected to said feedback signal such that the amount of voltage drop across each current control circuit is varied based upon the level of said feedback signal applied to said gate.

* * * * *